US011947428B2

United States Patent
Raspudic et al.

(10) Patent No.: US 11,947,428 B2
(45) Date of Patent: Apr. 2, 2024

(54) ARCHIVE CONTROL TECHNIQUES FOR DATABASE SYSTEMS

(71) Applicant: salesforce.com, inc., San Francisco, CA (US)

(72) Inventors: Steven Raspudic, Walnut Creek, CA (US); Hefeng Yuan, Sammamish, WA (US); Jeffrey Alexander Zoch, San Francisco, CA (US); Goutham Meruva, Danville, CA (US); Praveenkumar Bagavathiraj, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 113 days.

(21) Appl. No.: 17/456,339

(22) Filed: Nov. 23, 2021

(65) Prior Publication Data

US 2023/0161672 A1 May 25, 2023

(51) Int. Cl.
  *G06F 11/14* (2006.01)
  *G06F 11/34* (2006.01)
  *G06F 16/11* (2019.01)

(52) U.S. Cl.
  CPC ...... *G06F 11/1466* (2013.01); *G06F 11/1453* (2013.01); *G06F 11/1471* (2013.01); *G06F 11/3452* (2013.01); *G06F 16/113* (2019.01)

(58) Field of Classification Search
  CPC ............. G06F 11/1466; G06F 11/1453; G06F 11/1471; G06F 11/3452; G06F 16/113
  See application file for complete search history.

(56) References Cited

U.S. PATENT DOCUMENTS

| 10,664,452 | B2 | 5/2020 | Abrashkevich et al. |
| 11,016,990 | B2 | 5/2021 | Wyatt et al. |
| 11,093,290 | B1* | 8/2021 | Chopra ............... G06F 11/3006 |
| 11,157,314 | B2 | 10/2021 | Zoch et al. |
| 2003/0021278 | A1 | 1/2003 | Domschitz et al. |
| 2018/0113767 | A1* | 4/2018 | Pogosyan ........... G06F 11/1453 |
| 2020/0319799 | A1* | 10/2020 | Mayer .................. G06F 3/0619 |
| 2020/0394462 | A1* | 12/2020 | Hild ..................... G06F 11/0754 |
| 2021/0173745 | A1 | 6/2021 | Zoch et al. |
| 2021/0216502 | A1 | 7/2021 | Subramanian et al. |
| 2021/0318935 | A1 | 10/2021 | Jacobs et al. |

* cited by examiner

*Primary Examiner* — Masud K Khan
(74) *Attorney, Agent, or Firm* — Kowert, Hood, Munyon, Rankin & Goetzel, P.C.; Michael B. Davis; Dean M. Munyon (57) ABSTRACT

Techniques are disclosed relating to archive operations for database systems. In some embodiments, a database system initiates one or more archive operations to archive one or more data extents for a database maintained by the database system. The system may halt archive activity for the database, in response to determining that archive operations for a threshold amount of data extents are initiated but not completed. The system may cancel at least one of the one or more archive operations. The system may determine to resume activity for the database based on determining that a threshold timer interval has elapsed and determining that a threshold amount of storage space is available for the database system. Disclosed embodiments may improve database availability, relative to traditional techniques.

20 Claims, 6 Drawing Sheets

ARCHIVE CONTROL TECHNIQUES FOR DATABASE SYSTEMS

BACKGROUND

Technical Field

This disclosure relates generally to database systems and more specifically to controlling archive operations to mitigate storage space issues.

Description of the Related Art

Database systems may store large data sets and the integrity of data may be important. Therefore, database systems typically perform various archive operations to generate backup versions of database information. This may include full backups of a database, partial backups, and database log backups, for example.

Availability of a database is also an important consideration for database system design. In some scenarios, archival activity can cause issues with storage space, which may affect the ability of the database system to remain available.

DETAILED DESCRIPTION

As discussed above, archive operations for a database system may occasionally cause storage space concerns (e.g., due to lack of available disc space when archive operations generate extra files for archiving). As one example context, some relational databases use log-structured merge-trees (LSM trees) as underlying storage. U.S. patent application Ser. No. 15/884,131, filed Jan. 30, 2018, is incorporated by reference herein in its entirety and discusses example record lookup techniques in the LSM data structure context. In LSM tree implementations, data is typically first written to a memory component and later transferred to on-disc storage, where it is merged through levels of a data structure. Each node in the data structure may correspond to a file (also referred to as an extent) that is used to store records. This may allow writing to the root level of the disc storage rather than locating and overwriting previous version(s) of the data. LSM tree implementations may also generate log files that track database operations, e.g., for purposes of system recovery.

In the LSM tree context, archive activity (both for log data and LSM node extents) may use substantial disc space. For example, the database system may copy extents to capture a snapshot of the extents at a given time (given that extents of the LSM tree may be subsequently updated by database activity before the backup completes) and schedule the copied extents for storage. In some scenarios, this may use unusual amounts of disc space. For example, when there is an aborted ticket for log archival or backup slowness the archival system may hold off too many extents and eventually crash the database.

In disclosed embodiments discussed in detail below, the database system is configured to pause and cancel archive operations in certain scenarios. This may trade point-in-time recoverability for database availability. The pause/cancel implementation may be analogized to an archival "circuit breaker" that trips enter a non-default archive state in which archive activity is paused, based on various metrics such as available storage space, the characteristics of extents in-flight for archiving, etc.

Thus, the disclosure below is directed to the technical field of database systems and more particularly to archive activity and increasing database availability. Disclosed embodiments address the technical problem of disc space issues related to archive activity which could cause database unavailability. The disclosed technical solutions track various database parameters over time and pause archive activity in certain scenarios to avoid running out of disc space, thereby advantageously improving database availability relative to traditional techniques.

Overview of Archival Circuit Breaker Embodiments

Figure 1:
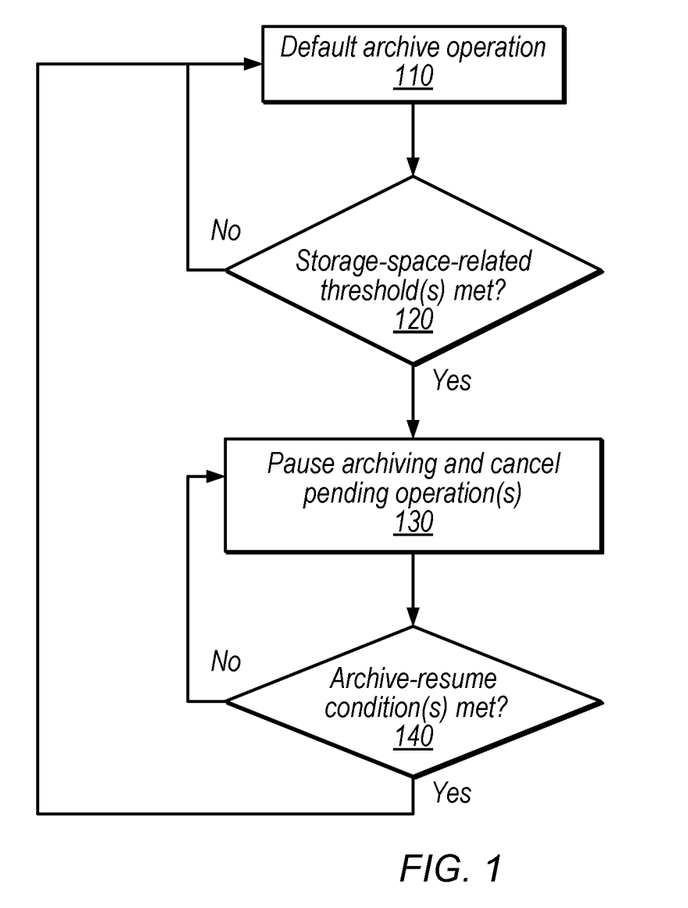
FIG. 1 is a flow diagram illustrating an example method for pausing and resuming archiving, according to some embodiments.

FIG. 1. is a flow diagram illustrating example archive state transitions, according to some embodiments. In the illustrated embodiment, the system operates in a default archive operation state at 110. In this state, the system may perform periodic backups, on-demand backups, backups of log files, etc. Speaking generally, various known or future techniques may be used to store backups in this state. In the LSM-tree context, backups may involve duplicating extents and scheduling them for backup to disc storage.

At 120, in the illustrated embodiment, the system determines whether one or more storage space related thresholds are met. For example, the system may determine whether in-flight archive extents meet a threshold data size (where "in-flight" refers to extents for which storage of which has been initiated, but not yet completed), other characteristics of the log extents in-flight, etc. As another example, the system may determine whether a threshold amount of disc storage is available. In some embodiments, the system may logically combine multiple parameters to determine whether one or more thresholds are met for tripping the circuit breaker. If the threshold(s) are met, flow proceeds to 130. If not, flow proceeds back to 110 and the system remains in the default state.

At 130, in the illustrated embodiment, the system pauses archiving and cancels one or more pending archive operations (this may include deleting one or more extents scheduled for disc storage). The system remains in the pause state for archiving until one or more archive-resume conditions are met, as determined at 140. One the resume condition(s) are met, flow proceeds to 110 and the system re-enters the default state (the circuit-breaker is closed). For example, the system may wait a threshold time interval, check for a threshold disc space availability before re-entering the default state, or both. In some embodiments, the system may logically combine multiple parameters to determine whether one or more conditions are met for closing the circuit breaker.

In some embodiments, there may be one or more transition states between the yes result at 140 and arriving back at 110, e.g., to perform a full backup, check storage metrics, etc. before resuming default operation. Example transition states are discussed below with reference to FIG. 3. Note that the illustrated operations may be performed on a per-cell (e.g., per-database) granularity such that some databases may continue archive activity while others are paused. Further, different cells may have different thresholds for tripping/closing the archival circuit breaker.

Example Database System with Archival Circuit Breaker

Figure 2:
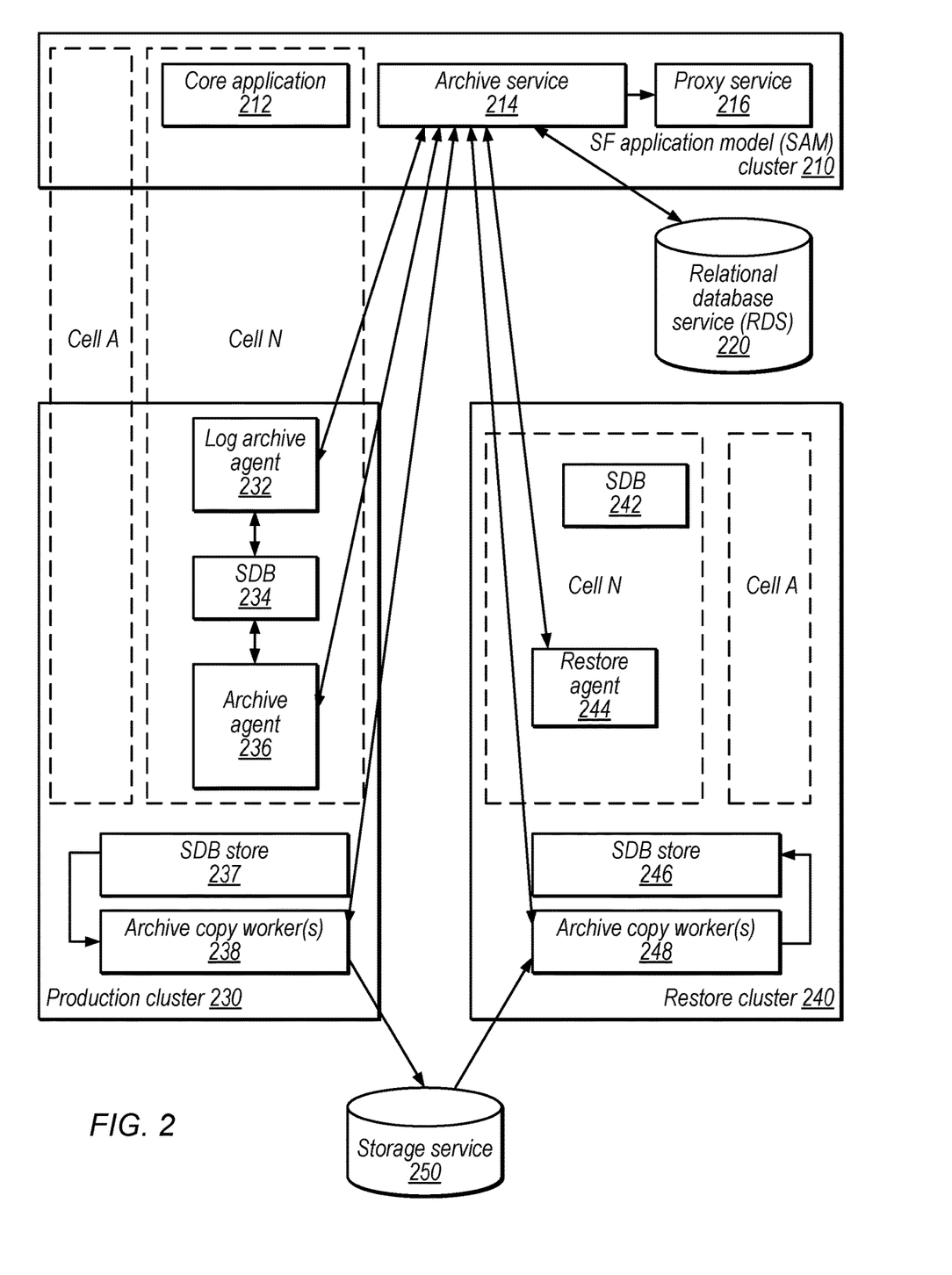
FIG. 2 is a block diagram illustrating a detailed example database system configured to perform archive operations for multiple database cells, according to some embodiments.

FIG. 2 is a block diagram illustrating a detailed example database system that may implement disclosed archive techniques, according to some embodiments. In the illustrated embodiment, the system includes Salesforce Application Model (SAM) cluster 210, relational database service (RDS) 220, production cluster 230, restore cluster 240, and storage service 250. Note that various elements of FIG. 2 may be maintained at different locations and connected via various appropriate types of networks. Note that the example of FIG. 2 is included for purposes of illustration to explain one example Salesforce implementation, but this figure is not intended to limit the scope of the present disclosure; various database system architectures are contemplated.

SAM cluster 210, in the illustrated embodiment, maintains a plurality of cells A through N. In the illustrated example, SAM cluster 210 includes a core application instance 212 for each cell. SAM cluster 210 also implements an archive service 214, which communicates with RDS 220 and proxy service 216. Proxy service 216 may provide a transparent data access layer that intelligently routes queries to the most optimal data source, resulting in SQL offload and improved response times. For example, proxy service 216 may cache SQL results and track SQL queries so they are routed to the appropriate database node for fresh data. RDS 220 provides relational database functionality. The archive service 214 may store metrics using proxy service 216 and may store scheduling and archival metadata in RDS 220.

Production cluster 230, in the illustrated embodiment, includes salesforce database (SDB) store 237 (which may be implemented by book-keeper storage servers), archive copy workers 238, and the following for each cell: a log archive agent 232, an SDB (which may be implemented by a database management server) 234, and an archive agent 236. In some embodiments, log archive agent 232, archive agent 236, or both implement disclosed archival circuit breaker techniques. As shown, the log archive agent 232 and archive agent 236 coordinate with archive service 214 and communicate with the SDB 234 and determine extents that should be archived. The archival copy workers 238 then copy/backup data from SDB store 237 for the production cluster to storage service 250 (and one or more archival copy workers 248 may similarly copy/restore data into the SDB store 246 in the restore cluster 240 based on configuration by restore agent 244). Storage service 250 may be S3 storage, for example.

The system may utilize various metadata and metrics discussed with reference to FIG. 2 to determine when to open and close the archival circuit breaker, among other types of information. For example, the system may trigger opening/closing based on triggers associated with metrics stored via proxy service 216, scheduling and archival metadata stored in RDS 220, log data, information shared between archival modules, etc.

Production cluster 230 and restore cluster 240 may also implement respective metadata servers, which are not shown in FIG. 2. In various embodiments, implementing disclosed archival circuit breaker techniques for an archive agent of a cell may advantageously increase availability of the cell, relative to traditional techniques.

In some embodiments, the circuit breaker techniques may use different thresholds for different cells. For example, some cells may have higher data retention priority than others. These cells may wait longer to trip their circuit breaker, e.g., to maintain more point-in-time backup data. Therefore, the system may use different thresholds for amounts of extents in-flight, disc space available, time intervals, etc. for different cells.

Further, the system may dynamically adjust various thresholds based on historical data. For example, the system may store various operational state information at different points in time. This may include the amount of extents in-flight for backup (e.g., the amount of disc space needed by in-flight extents, the number of in-flight extents, etc.), disc space availability, operation conditions specifically associated with unavailability of the database due to lack of disc space, etc. The system may implement various logic to determine when to adjust a threshold. For example, the system may use one or more machine learning models to adjust one or more thresholds. For example, a machine learning module may implement a model using any of various appropriate topologies, such as, without limitation: neural network, naïve Bayes, decision tree, linear regression, learning vector quantization, random forest, K-nearest neighbors, etc. The model may adjust thresholds to attempt to provide good point-in-time archive characteristics while avoiding database unavailability due to running out of disc space.

In some embodiments, some cells may not implement archival circuit breaker techniques at all. Further, the granularity at which backups may be paused/resumed may vary in different embodiments. For example, while the examples discussed above include one or more agents with archival circuit breaker features per cell, this functionality may be implemented at the granularity of an entire SAM cluster instead, for example, or for one or more sub-portions of a cell.

More Detailed State Diagram

Figure 3:
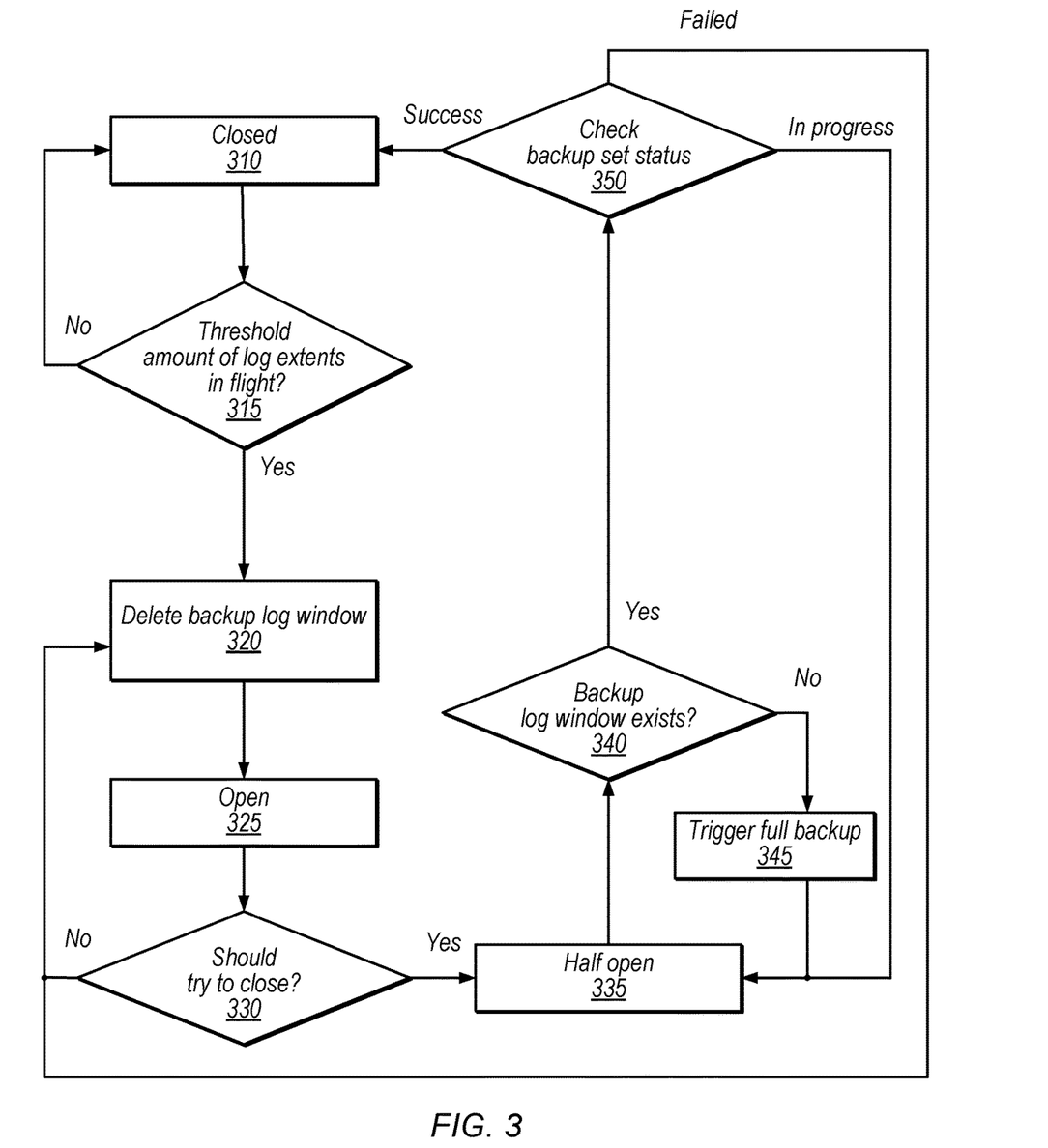
FIG. 3 is a state diagram illustrating detailed example states for an archival circuit breaker, according to some embodiments.

FIG. 3 is a more detailed state diagram for an archival circuit breaker, according to some embodiments. In the illustrated embodiment, the system remains in the closed state 310 for default archival operation until there is a threshold amount of log extents in flight at 315. This threshold may be measured in terms of the sum of the sizes of in-flight extents, for example. In other embodiments, this threshold may be determined as an estimate, e.g., based on the number of in-flight extents and a predicted greatest-possible extent size. In some embodiments, element 315 also checks whether there is a threshold amount of disc space available. As discussed above with reference to FIG. 1, element 315 may consider multiple parameters in conjunction to determine whether to trip the archival circuit breaker. If the threshold is met, flow proceeds to 320.

At 320, in the illustrated embodiment, the system deletes the backup log window (the list of extents to be backed up). This may allow the system to delete extents from primary storage to free up disc space. At 325, in the illustrated embodiment, the system is in the circuit-breaker-open state and archive operations for the database are paused.

At 330, the systems determines whether it should try to close the circuit breaker. This may include waiting for a threshold time interval, checking for a threshold amount of disc space available, etc., or some combination thereof. If element 330 determines a positive result, the system transitions to half-open state 335. In this state, the system checks whether a backup log window exists at 340 and triggers a full backup if so (which will create a backup log window). The system waits at 350 until the full backup has successfully completed and then transitions back to closed state 310. If the backup fails at 350, the system deletes the backup log window and transitions back to the open state.

Example Method

Figure 4:
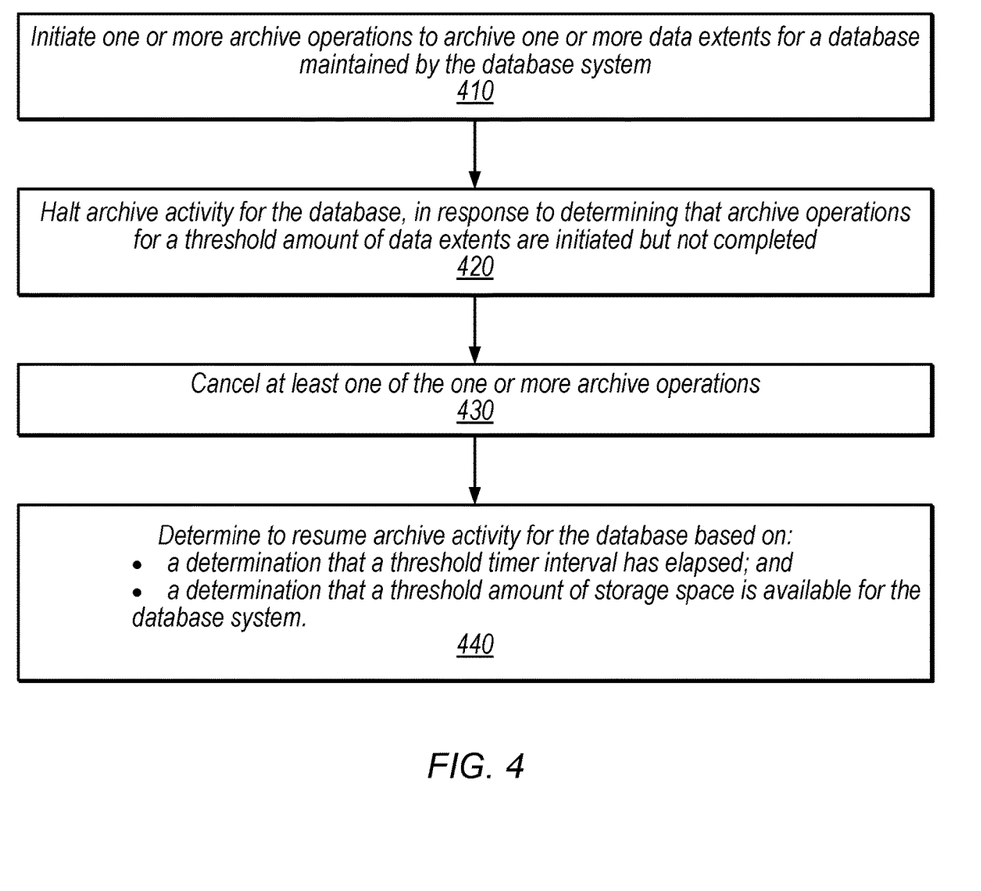
FIG. 4 is a flow diagram illustrating another example method, according to some embodiments.

FIG. 4 is a flow diagram illustrating an example method, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a database system initiates one or more archive operations to archive one or more data extents for a database maintained by the database system. In some embodiments, the database is maintained by the database system using a log-structured merge-tree (LSM tree) and the data extents are elements of the LSM tree that are duplicated by the database system when generating an archive snapshot of the database.

At 420, in the illustrated embodiment, a database system halts archive activity for the database, in response to determining that archive operations for a threshold amount of data extents are initiated but not completed. The halting may be further based on determining that less than a threshold amount of storage space is available. The amount of data extents may indicate to the data size of in-flight data extents, number of in-flight data extents, other characteristics of in-flight data extents, or some combination thereof.

At 430, in the illustrated embodiment, a database system cancels at least one of the one or more archive operations. The database system may also delete one or more duplicate extents that were generated for one or more canceled archive operations. More generally, the database system may delete backup files, metadata, etc. that is not used while archiving is paused. The system may further delete a backup log window. The system may, in response to a threshold time interval elapsing, transitioning to a half-open operating state. The system may trigger a full backup of the database in the half-open operating state. The system may, in response to successful completion of the full backup, transition to a default operating state. The transition to the half-open state is may be further based on a determination that a threshold amount of storage space is available.

At 440, in the illustrated embodiment, a database system determines to resume archive activity for the database based on determinations that (A) a threshold timer interval has elapsed and (B) a threshold amount of storage space is available for the database system. In other embodiments, the database system may determine to resume archive activity based on only one of these determinations or on some combinations of one or more of these determinations with one or more other parameters.

In some embodiments, the database system stores different halt thresholds for different databases maintained by the database system. The database system may halt archive activity for a second database in response to determining that archive operations for a different threshold amount of data extents are initiated but not completed. The database system may cancel one or more archive operations for the second database. This may advantageously allow customization of archival circuit-breaker functionality for different cells with different data retention priorities, for example.

In some embodiments, the database system stores historical data that indicates database status information for one or more prior archive halt operations (e.g., amounts of in-flight extents at different times, operating state associated with unavailability of a database, database characteristics at different times, etc.). The system may dynamically adjust one or more thresholds for halting or resuming archive operations for the database based on the historical data. For example, the system may adjust a threshold amount of data extents in flight, a threshold disc space available, a threshold time interval, etc. In some embodiments, a machine learning module performs the dynamic adjustment.

Example Multi-Tenant Database System

Figure 5:
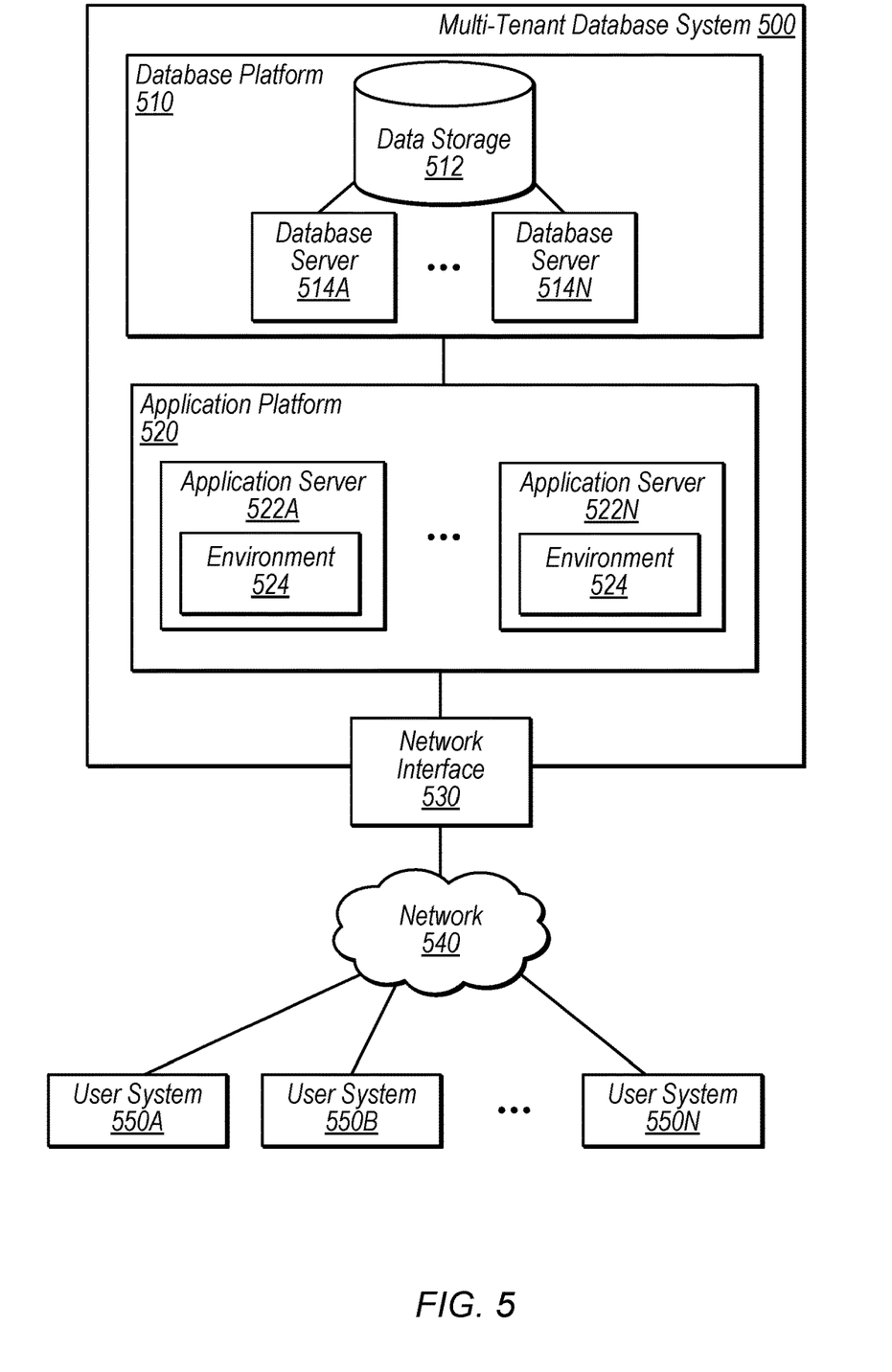
FIG. 5 is a block diagram illustrating elements of a multi-tenant system, according to some embodiments.

Turning now to FIG. 5, an exemplary multi-tenant database system (MTS) 500 in which various techniques of the present disclosure can be implemented is shown. In FIG. 5, MTS 500 includes a database platform 510, an application platform 520, and a network interface 530 connected to a network 540. Also as shown, database platform 510 includes a data storage 512 and a set of database servers 514A-N that interact with data storage 512, and application platform 520 includes a set of application servers 522A-N having respective environments 524. In the illustrated embodiment, MTS 500 is connected to various user systems 550A-N through network 540. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 500, in various embodiments, is a set of computer systems that together provide various services to users (alternatively referred to as "tenants") that interact with MTS 500. In some embodiments, MTS 500 implements a customer relationship management (CRM) system that provides mechanism for tenants (e.g., companies, government bodies, etc.) to manage their relationships and interactions with customers and potential customers. For example, MTS 500 might enable tenants to store customer contact information (e.g., a customer's website, email address, telephone number, and social media data), identify opportunities, record service issues, and manage marketing campaigns. MTS 500 may also enable those tenants to identify how customers have been communicated with, what the customers have bought, when the customers last purchased items, and what the customers paid. To provide the services of a CRM system and/or other services, as shown, MTS 500 includes a database platform 510 and an application platform 520.

Database platform 510, in various embodiments, is a combination of hardware elements and software routines that implement database services for storing and managing data of MTS 500, including tenant data. As shown, database platform 510 includes data storage 512. Data storage 512, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 512 is used to implement a database comprising a collection of information that is organized in a way that allows for access, storage, and manipulation of the information. Data storage 512 may implement a single database, a distributed database, a collection of distributed databases, a database with redundant online or offline backups or other redundancies, etc. As part of implementing the database, data storage 512 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 500 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 512 is organized as part of a log-structured merge-tree (LSM tree). An LSM tree normally includes two high-level components: an in-memory buffer and a persistent storage. In operation, a database server 514 may initially write database records into a local in-memory buffer before later flushing those records to the persistent storage (e.g., data storage 512). As part of flushing database records, the database server 514 may write the database records into new files that are included in a "top" level of the LSM tree. Over time, the database records may be rewritten by database servers 514 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 512.

When a database server 514 wishes to access a database record for a particular key, the database server 514 may traverse the different levels of the LSM tree for files that potentially include a database record for that particular key. If the database server 514 determines that a file may include a relevant database record, the database server 514 may fetch the file from data storage 512 into a memory of the database server 514. The database server 514 may then check the fetched file for a database record having the particular key. In various embodiments, database records are immutable once written to data storage 512. Accordingly, if the database server 514 wishes to modify the value of a row of a table (which may be identified from the accessed database record), the database server 514 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 514, in various embodiments, are hardware elements, software routines, or a combination thereof capable of providing database services, such as data storage, data retrieval, and/or data manipulation. Such database services may be provided by database servers 514 to components (e.g., application servers 522) within MTS 500 and to components external to MTS 500. As an example, a database server 514 may receive a database transaction request from an application server 522 that is requesting data to be written to or read from data storage 512. The database transaction request may specify an SQL SELECT command to select one or more rows from one or more database tables. The contents of a row may be defined in a database record and thus database server 514 may locate and return one or more database records that correspond to the selected one or more table rows. In various cases, the database transaction request may instruct database server 514 to write one or more database records for the LSM tree—database servers 514 maintain the LSM tree implemented on database platform 510. In some embodiments, database servers 514 implement a relational database management system (RDMS) or object oriented database management system (OODBMS) that facilitates storage and retrieval of information against data storage 512. In various cases, database servers 514 may communicate with each other to facilitate the processing of transactions. For example, database server 514A may communicate with database server 514N to determine if database server 514N has written a database record into its in-memory buffer for a particular key.

Application platform 520, in various embodiments, is a combination of hardware elements and software routines that implement and execute CRM software applications as well as provide related data, code, forms, web pages and other information to and from user systems 550 and store related data, objects, web page content, and other tenant information via database platform 510. In order to facilitate these services, in various embodiments, application platform 520 communicates with database platform 510 to store, access, and manipulate data. In some instances, application platform 520 may communicate with database platform 510 via different network connections. For example, one application server 522 may be coupled via a local area network and another application server 522 may be coupled via a direct network link. Transfer Control Protocol and Internet Protocol (TCP/IP) are exemplary protocols for communicating between application platform 520 and database platform 510, however, it will be apparent to those skilled in the art that other transport protocols may be used depending on the network interconnect used.

Application servers 522, in various embodiments, are hardware elements, software routines, or a combination thereof capable of providing services of application platform 520, including processing requests received from tenants of MTS 500. Application servers 522, in various embodiments, can spawn environments 524 that are usable for various purposes, such as providing functionality for developers to develop, execute, and manage applications (e.g., business logic). Data may be transferred into an environment 524 from another environment 524 and/or from database platform 510. In some cases, environments 524 cannot access data from other environments 524 unless such data is expressly shared. In some embodiments, multiple environments 524 can be associated with a single tenant.

Application platform 520 may provide user systems 550 access to multiple, different hosted (standard and/or custom) applications, including a CRM application and/or applications developed by tenants. In various embodiments, application platform 520 may manage creation of the applications, testing of the applications, storage of the applications into database objects at data storage 512, execution of the applications in an environment 524 (e.g., a virtual machine of a process space), or any combination thereof. In some embodiments, application platform 520 may add and remove application servers 522 from a server pool at any time for any reason, there may be no server affinity for a user and/or organization to a specific application server 522. In some embodiments, an interface system (not shown) implementing a load balancing function (e.g., an F5 Big-IP load balancer) is located between the application servers 522 and the user systems 550 and is configured to distribute requests to the application servers 522. In some embodiments, the load balancer uses a least connections algorithm to route user requests to the application servers 522. Other examples of load balancing algorithms, such as are round robin and observed response time, also can be used. For example, in certain embodiments, three consecutive requests from the same user could hit three different servers 522, and three requests from different users could hit the same server 522.

In some embodiments, MTS 500 provides security mechanisms, such as encryption, to keep each tenant's data separate unless the data is shared. If more than one server 514 or 522 is used, they may be located in close proximity to one another (e.g., in a server farm located in a single building or campus), or they may be distributed at locations remote from one another (e.g., one or more servers 514 located in city A and one or more servers 522 located in city B). Accordingly, MTS 500 may include one or more logically and/or physically connected servers distributed locally or across one or more geographic locations.

One or more users (e.g., via user systems 550) may interact with MTS 500 via network 540. User system 550 may correspond to, for example, a tenant of MTS 500, a provider (e.g., an administrator) of MTS 500, or a third party. Each user system 550 may be a desktop personal computer, workstation, laptop, PDA, cell phone, or any Wireless Access Protocol (WAP) enabled device or any other computing device capable of interfacing directly or indirectly to the Internet or other network connection. User system 550 may include dedicated hardware configured to interface with MTS 500 over network 540. User system 550 may execute a graphical user interface (GUI) corresponding to MTS 500, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 550 to access, process, and view information and pages available to it from MTS 500 over network 540. Each user system 550 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 500 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 550 may be users in differing capacities, the capacity of a particular user system 550 might be determined one or more permission levels associated with the current user. For example, when a user is using a particular user system 550 to interact with MTS 500, that user system 550 may have capacities (e.g., user privileges) allotted to that user. But when an administrator is using the same user system 550 to interact with MTS 500, the user system 550 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 500 that are allocated at the tenant level while other data structures are managed at the user level.

In some embodiments, a user system 550 and its components are configurable using applications, such as a browser, that include computer code executable on one or more processing elements. Similarly, in some embodiments, MTS 500 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 540 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 550 may communicate with MTS 500 using TCP/IP and, at a higher network level, use other common Internet protocols to communicate, such as HTTP, FTP, AFS, WAP, etc. For example, where HTTP is used, user system 550 might include an HTTP client commonly referred to as a "browser" for sending and receiving HTTP messages from an HTTP server at MTS 500. Such a server might be implemented as the sole network interface between MTS 500 and network 540, but other techniques might be used as well or instead. In some implementations, the interface between MTS 500 and network 540 includes load sharing functionality, such as round-robin HTTP request distributors to balance loads and distribute incoming HTTP requests evenly over a plurality of servers.

In various embodiments, user systems 550 communicate with application servers 522 to request and update system-level and tenant-level data from MTS 500 that may require one or more queries to data storage 512. In some embodiments, MTS 500 automatically generates one or more SQL statements (the SQL query) designed to access the desired information. In some cases, user systems 550 may generate requests having a specific format corresponding to at least a portion of MTS 500. As an example, user systems 550 may request to move data objects into a particular environment 524 using an object notation that describes an object relationship mapping (e.g., a JavaScript object notation mapping) of the specified plurality of objects.

Example Computer System

Figure 6:
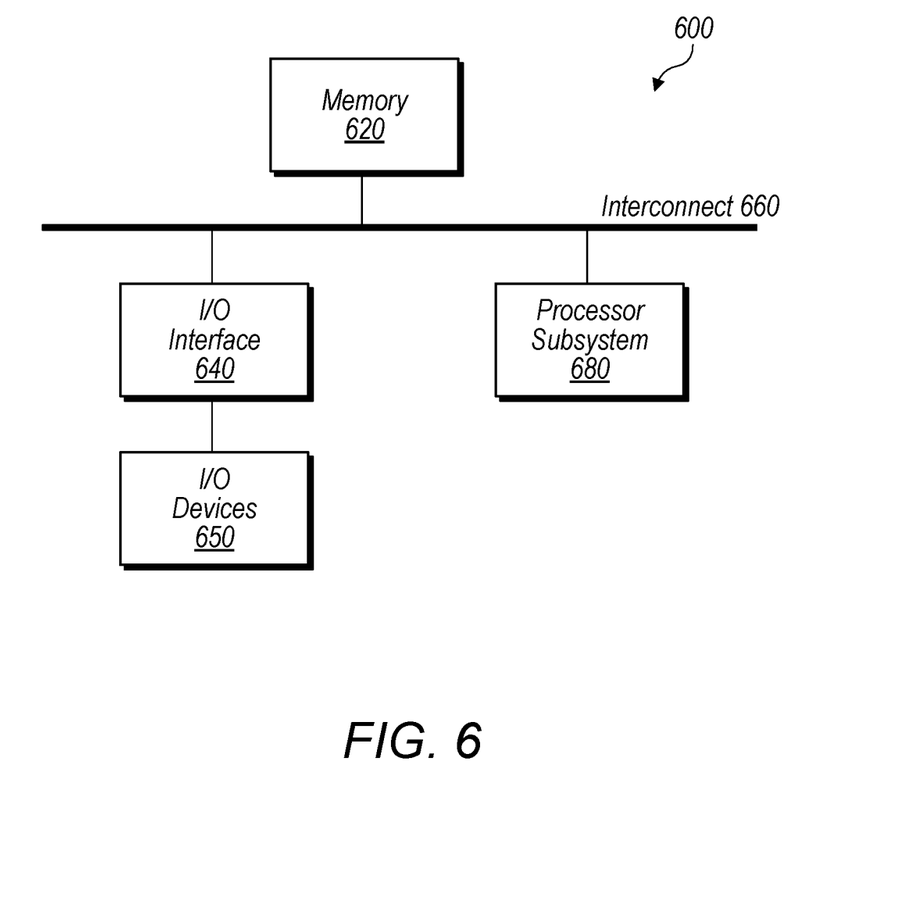
FIG. 6 is a block diagram illustrating elements of a computer system configured to implement various systems described in the present disclosure, according to some embodiments.

Turning now to FIG. 6, a block diagram of an exemplary computer system 600, which may implement various elements discussed herein, including MTS 500, and/or user system 550, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   initiating, by a database system, one or more backup operations to backup multiple data extents for a database maintained by the database system;
   halting backup activity for the database, by the database system, in response to determining that backup operations for a threshold amount of data extents are in a first state in which a backup operation has been initiated for the data extent but not completed;
   canceling, by the database system, at least one of the one or more backup operations; and
   determining, by the database system, to resume backup activity for the database based on:
     determining that a threshold timer interval has elapsed; and
     determining that a threshold amount of storage space is available for the database system.

2. The method of claim 1, wherein the database is maintained by the database system using a log-structured merge-tree (LSM tree) and the data extents are elements of the LSM tree that are duplicated by the database system when generating a backup snapshot of the database.

3. The method of claim 2, further comprising:
   deleting one or more duplicate extents that were generated for one or more canceled backup operations.

4. The method of claim 1, further comprising:
   storing, by the database system, different halt thresholds for different databases maintained by the database system;
   halting backup activity for a second database, by the database system, in response to determining that backup operations for a different threshold amount of data extents are in the first state, wherein the second database has a different retention priority than the database; and
   canceling, by the database system, one or more backup operations for the second database.

5. The method of claim 1, further comprising, in response to the determining that backup operations for the threshold amount of data extents are in the first state:
deleting, by the database system, a backup log window;
in response to a threshold time interval elapsing, the database system, transitioning to a half-open operating state;
triggering, by the database system, a full backup of the database in the half-open operating state; and
in response to successful completion of the full backup, the database system transitioning to a default operating state.

6. The method of claim 5, wherein the transitioning to the half-open state is further based on a determination that a threshold amount of storage space is available.

7. The method of claim 1, wherein the halting is further based on determining that less than a threshold amount of storage space is available.

8. The method of claim 1, further comprising:
storing, by the database system, historical data that indicates database status information for one or more prior backup halt operations; and
dynamically adjusting, by the database system, the threshold amount of data extents for halting backup operations for the database, based on the historical data.

9. The method of claim 8, wherein the dynamically adjusting is performed by a machine learning module.

10. A non-transitory computer-readable medium having computer instructions stored thereon that are capable of being executed by a computer system to cause operations comprising:
initiating one or more backup operations to backup multiple data extents for a database maintained by a database system;
halting backup activity for the database, in response to determining that backup operations for a threshold amount of data extents are in a first state in which a backup operation has been initiated for the data extent but not completed;
canceling at least one of the one or more backup operations; and
determining to resume backup activity for the database based on:
determining that a threshold timer interval has elapsed; and
determining that a threshold amount of storage space is available for the database system.

11. The non-transitory computer-readable medium of claim 10, wherein the database is maintained by the database system using a log-structured merge-tree (LSM tree) and the data extents are elements of the LSM tree that are duplicated when generating a backup snapshot of the database.

12. The non-transitory computer-readable medium of claim 11, wherein the operations further comprise:
deleting one or more duplicate extents that were generated for one or more canceled backup operations.

13. The non-transitory computer-readable medium of claim 10, wherein the operations further comprise:
storing different halt thresholds for different databases maintained by the database system;
halting backup activity for a second database in response to determining that backup operations for a different threshold amount of data extents are in the first state, wherein the second database has a different retention priority than the database; and
canceling one or more backup operations for the second database.

14. The non-transitory computer-readable medium of claim 10, wherein the operations further comprise:
deleting a backup log window;
in response to a threshold time interval elapsing, transitioning to a half-open operating state;
triggering a full backup of the database in the half-open operating state; and
in response to successful completion of the full backup, transitioning to a default operating state.

15. The non-transitory computer-readable medium of claim 10, wherein the halting is further based on determining that less than a threshold amount of storage space is available.

16. The non-transitory computer-readable medium of claim 10, wherein the operations further comprise:
storing historical data that indicates database status information for one or more prior backup halt operations; and
dynamically adjusting the threshold amount of data extents for halting backup operations for the database, based on the historical data.

17. A system, comprising:
one or more processors; and
one or more memories having program instructions stored thereon that are capable of being executed by the one or more processors to:
initiate one or more backup operations to backup multiple data extents for a database maintained by the system;
halt backup activity for the database, in response to determining that backup operations for a threshold amount of data extents are in a first state in which a backup operation has been initiated for the data extent but not completed;
cancel at least one of the one or more backup operations; and
determine to resume backup activity for the database based on:
a determination that a threshold timer interval has elapsed; and
a determination that a threshold amount of storage space is available for the system.

18. The system of claim 17, wherein the database is maintained by the system using a log-structured merge-tree (LSM tree) and the data extents are elements of the LSM tree that the system is configured to duplicate when generating a backup snapshot of the database.

19. The system of claim 17, wherein the system is configured to store different backup halt thresholds for different databases maintained by the database system.

20. The system of claim 17, wherein the instructions are further capable of being executed to:
delete a backup log window;
in response to a threshold time interval elapsing, transition to a half-open operating state;
trigger a full backup of the database in the half-open operating state; and
in response to successful completion of the full backup, transition to a default operating state.

* * * * *